Aug. 8, 1944.   F. W. ANDERSON   2,355,358
BLOWING MACHINE
Filed Aug. 2, 1940   2 Sheets-Sheet 1

INVENTOR.
FRANK W. ANDERSON
BY
ATTORNEY.

Aug. 8, 1944.   F. W. ANDERSON   2,355,358
BLOWING MACHINE
Filed Aug. 2, 1940   2 Sheets-Sheet 2

INVENTOR.
FRANK W. ANDERSON
BY
ATTORNEY.

Patented Aug. 8, 1944

2,355,358

UNITED STATES PATENT OFFICE 2,355,358

BLOWING MACHINE

Frank W. Anderson, Hinsdale, Ill., assignor to The Philip Carey Manufacturing Company, a corporation of Ohio Application August 2, 1940, Serial No. 349,707

12 Claims. (Cl. 83—6)

This invention relates to a machine for installing insulating material, particularly that of a fibrous character, into place by pneumatic means. It pertains especially to a compact and portable unit into which any type of loosely matted fibrous material of entangled fibers may be fed and will in passing through the machine be pulled apart and separated into shreds or nodules of relatively uniform sizes for uninterrupted and continuous supply feed through an air hose to the point of installation or discharge.

While the machine is especially suitable for installing loosely matted fibrous material of entangled fibers, material already in nodulated or shredded form may also be used. Where the material is loosely matted fibers, such as mineral wool blown from rock or slag, the matted material is pulled apart and separated into shreds or nodules to be flowable or pourable as material already nodulated or shredded would be flowable or pourable. Whether the material is initially shredded or nodulated before being fed to the machine or by the machine as it is fed therethrough, the machine feeds and delivers the material from the blow chamber to the outlet or hose in a uniform and continuous stream, this constant and continuous feeding being attained by dividing the feeding chamber into a plurality of compartments of substantial lengths and having each of a cross sectional area substantially equal to the cross sectional area of the outlet or hose into which the material is discharged from the compartments. For breaking up the loosely matted fibrous material, a plurality of rows of shear bars are disposed above a picker roll, one row being above another and having the shear bars therein more widely spaced than the shear bars in the row therebeneath. While any number of rows of shear bars may be used, two are deemed sufficient.

For a better understanding of the invention reference may be made to the accompanying drawings in which.

Figure 1:
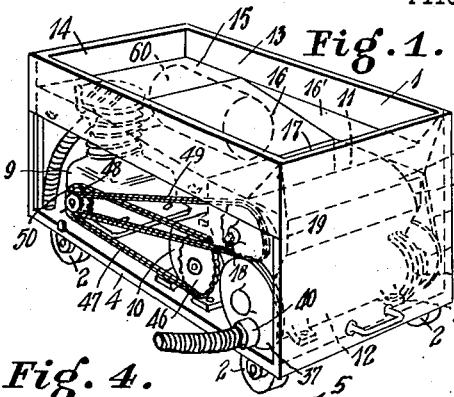
Fig. 1 is a perspective view, on much reduced scale, of a machine, with one side plate removed, embodying the invention.
Figure 2:
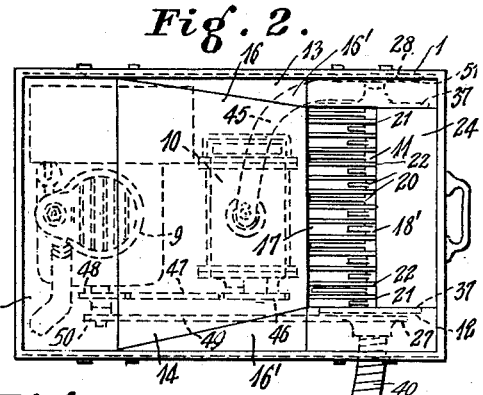
Fig. 2 is a plan view of the machine on approximately the scale of Fig. 1.
Figure 4:
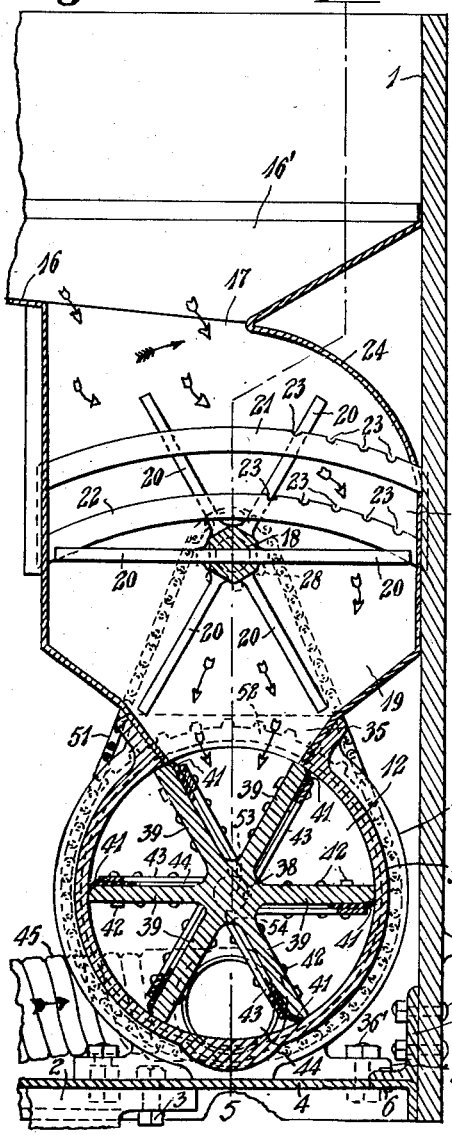
Fig. 4 is a vertical section of the same on the plane of the line 4—4 of Fig. 3.
Figure 3:
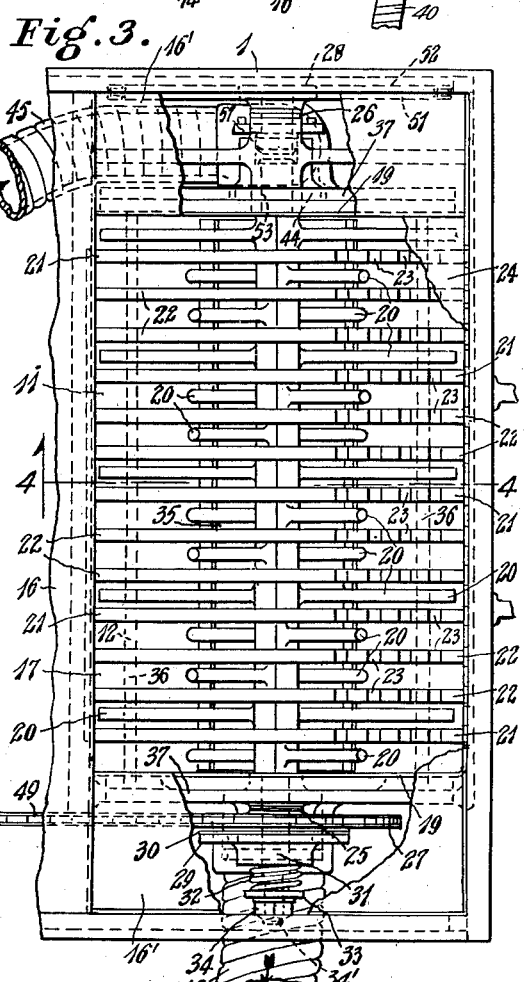
Fig. 3 is an enlarged plan view of the right end part of the machine, certain upper portions being broken away to show the picker device and the shear bars thereabove.
Figure 5:
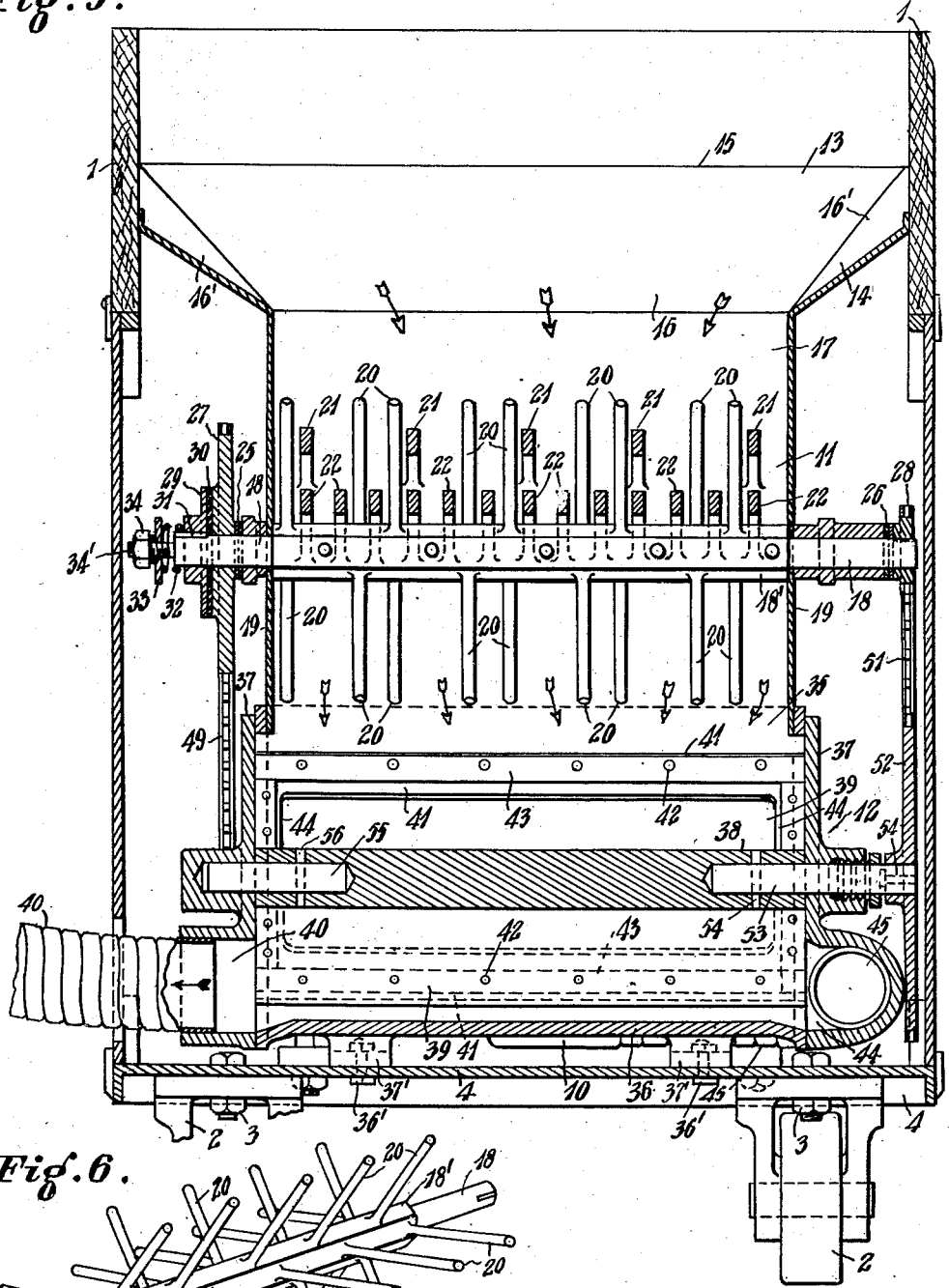
Fig. 5 is a vertical cross section on the plane of the broken line 5—5 of Fig. 4.
Figure 6:
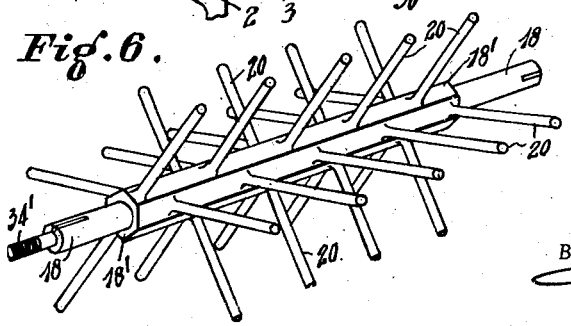
Fig. 6 is a perspective view of the picker device.

Referring to the drawings, numeral 1 designates a frame member mounted upon casters 2 which are bolted or otherwise attached at 3 to a steel bed plate 4. The steel bed plate is secured to the frame member 1 by corner brackets 5 riveted or bolted at 6 and 7 to the frame and bed plate. The casters provide for easily moving the device over a floor, and side handles may be conveniently attached to permit the machine being grasped to facilitate pushing and guiding it when moved about for loading same on and off of a truck or placing it in position for use. Within the frame a motor unit 9, a blower 10, a picking device 11 and feeding device 12 are mounted, all being connected by suitable power transmission means. There is inserted in the top of the frame a housing 13 to provide a hopper 14 having a bottom 15 and portions 16' 16' thereof inclined towards opening 17, leading to the picking device 11, through which the insulating material is fed to the machine.

The picking device is disposed beneath the opening 17 and comprises a shaft 18, mounted on the side walls 19 of the housing 13, and a plurality of fingers 20, preferably axially arranged in sets of three pairs, each of which is disposed at an angle of about thirty (30) degrees with the adjacent pair so that each set will provide about six fingers disposed about the shaft. The fingers of each set also provide rows axially aligned along the shaft. The fingers 20 may be fixed directly to the shaft 18 or to a collar 18' fixed thereon. Rows 21 and 22 of shear bars are mounted in the housing 13 above the shaft 18 but at less distance than the length or radius of the fingers 20 so that the loosely matted material passes through a zone between the fingers and the shear bars. The shear bars are preferably arcuate and provided on their upper surfaces with notches 23, at least near the ends where the fingers move away from the shear bars. These notches engage the matted fibrous material to prevent it from sliding on the top of the shear bars. They hold the material while it is being pulled apart by the picker fingers.

The shear bars in upper row 21 are preferably more widely spaced apart than are the shear bars in row 22. For example, there is one bar in the upper row for every three bars in the lower row of shear bars. The purpose of the wider spacing of the shear bars in the upper row is to first break up the matted material into larger shreds or nodules and then further break it into smaller shreds or nodules. There is a progressive breaking up of the material into smaller shreds or nodules as it passes through the machine.

That portion 24 of the housing 13 adjacent the ends of the shear bars where the picker fingers move away is preferably of arcuate conformation and of progressively lesser distance from the ends of the fingers as the wall portions converges at the ends of the shear bars. This construction of the wall portion 24 of the housing provides a shield to prevent the material from building up between the casing and the shear bars.

Shaft 18, which carries the picker device, projects through the side walls of the housing, is provided with thrust collars 25 and 26 placed between the outside of the housing side walls and respective sprockets 27 and 28. Collar 29, having a friction facing 30 and keyed at 31 to shaft 18, is resiliently pressed by spring 32 against sprocket 27 so that the sprocket is frictionally driven. The frictional drive permits the sprocket to slip on the friction facing if any obstruction, which can not pass through the picker device, should find its way into the machine. The spring is held in position by washer 33 and the nut 34 which is screw threaded to the shaft 18 at 34'. Sprocket 28 is fixed on the other end of the shaft 18 opposite to the screw threaded end to which the nut 34 is fitted.

The housing 13 below the picker device opens at 35 into the feeding device 12 comprising cylindrical housing wall 36 and ends 37 within which rotates a shaft 38 having mounted thereon blades 39 to divide the feed chamber into six separate compartments, one of which will be in alignment with opening 35 to be filled from the picker chamber while the one diametrically opposite is in alignment with the discharge outlet 40 and is being emptied. There should, preferably, be two blades on each side forming a seal with the inner wall of the feeder chamber between the inlet and discharge openings while one compartment is being filled and another is being emptied. To provide effective sealing between the blades and the interior housing wall, the ends of each blade may be advantageously provided with a flexible flap 41 of some suitable material such as rubber or leather clamped in place by rivets or bolts 42 and metal plates 43. Similar flexible flaps 44 may also be provided on the ends of the blades to provide an air seal between them and the side walls of the housing. Opposite the discharge outlet 40 in the feeder housing is an inlet opening 44 to which a hose 45, leading from the blower 10, is connected. The wall 36 of the feeding device 12 is provided with a pedestal or base 37' that can be conveniently bolted at 36' to the bed plate 4.

Sprocket 46 on the blower is driven by sprocket chain 47 fitting thereon and on sprocket 48 mounted on the motor unit. Sprocket chain 49 is circumvolved over the sprocket 50 also on the motor unit and the sprocket 27 on the picker shaft. Sprocket chain 51 is circumvolved over the sprocket 52 on the stub shaft 53, keyed at 54 to the feeder shaft 38 and the sprocket 28 on the picker shaft. Stub shaft 55 is keyed at 56 to the other end of the feeder shaft 38. The stub shafts are journalled in the end walls 37 of the feeder device 12, and shaft 53 has a stuffing box 57. The single motor unit 9 is thus employed to actuate the picker shaft which in turn drives the feeder shaft by means of sprocket chain 51, and the blower by chain 47.

In this instance, the motor unit is typified by a gasoline motor, and a gas supply tank 60 is therefore provided within the frame. An electric motor could, of course, be used in lieu of the gasoline motor.

While the device has been described in detail and in connection with one type of insulating material, it will be understood that there may be various changes in details of construction without departing from the spirit of the invention.

I claim:

1. A machine for shredding or nodulating loosely matted fibrous material comprising a shredding or nodulating device for progressively breaking up the material from larger to smaller shreds, rotatable picker fingers and a plurality of rows of shear bars radially spaced apart within the radius of the picker fingers between which all of the material is fed for being progressively broken up from larger to smaller shreds.

2. A machine for shredding or nodulating loosely matted fibrous material comprising a shredding or nodulating device for progressively breaking up the material from larger to smaller shreds, rotatable picker fingers and a plurality of rows of radially spaced apart shear bars within the radius of the fingers between which all of the material is fed for being progressively broken up from larger to smaller shreds, said bars being provided with irregular surfaces to prevent the material sliding thereon.

3. A machine for shredding or nodulating loosely matted fibrous material comprising a shredding or nodulating device for progressively breaking up the material from larger to smaller shreds, rotatable picker fingers and a plurality of rows of shear bars radially spaced apart within the radius of the picker fingers, the bars in the row farthest from the axis of the fingers being more widely spaced axially than those bars in the row nearest the axis of the picker fingers.

4. A machine for shredding or nodulating matted fibrous material comprising a shredding or nodulating device for progressively breaking up the material, including rotatable fingers, and a plurality of rows of shear bars radially spaced apart within the radius of the fingers, the bars of the row farthest removed from the axis of the fingers being more widely spaced apart than the bars in the other row.

5. A machine for shredding or nodulating matted fibrous material comprising a shredding or nodulating device for progressively breaking up the material, including rotatable fingers, a row of shear bars disposed within the radius of the fingers, and means disposed adjacent the portions of the shear bars providing a wall at an acute angle to the bars at the point where the fingers move away from the bars to prevent the material from building up in the machine.

6. A machine for shredding or nodulating matted fibrous material comprising a shredding or nodulating device for breaking up the material, including a single shaft with radially disposed fingers thereon, a row of shear bars spaced within the radius of the fingers, means to retard slipping of the material on the surface of the bars, and means disposed adjacent portions of the shear bars providing a wall at an acute angle to the bars at the point where the fingers move away from the bars to prevent the material building up in the machine.

7. A machine for shredding or nodulating matted fibrous material comprising a shredding or nodulating device for progressively breaking up the material from larger to smaller shreds, rotating picking fingers, a plurality of rows of shear bars radially spaced apart within the radius of the picker fingers, a discharge conduit, a device between the discharge conduit and shredding device having a plurality of feeding compartments rotatable on an axis substantially in alignment with the axis of the picker fingers, and a hopper having an opening disposed between the picker fingers and the feeder compartments having walls substantially coinciding with the walls of the feeding compartments.

8. A machine for shredding or nodulating loosely matted fibrous material and installing the shredded or nodulated material comprising a shredding or nodulating device composed of rotatable picker fingers and a plurality of rows of radially spaced apart stator bars within the radius of the picker fingers between which all of the material is fed for progressively breaking up the material from larger to smaller shreds, a discharge hose, a series of feeding compartments of a cross-sectional area substantially equal to that of the hose for discharging the shredding material from the feeding device to the hose in a substantially uniformly continuous stream, and a hopper having an opening disposed between the picker fingers and the feeding compartments having walls substantially coinciding with walls of the feeding compartments.

9. A machine for shredding or nodulating loosely matted fibrous material comprising a shredding or nodulating device for progressively breaking up the material from larger to smaller shreds, rotatable picker fingers and a plurality of rows of radially spaced apart shear bars within the radius of the fingers between which all of the material is fed for being progressively broken up from larger to smaller shreds, said bars being provided with means to prevent the material sliding thereon, and the bars in the row farthest from the axis of the fingers being more widely spaced axially than those bars in the row nearest the axis of the picker fingers.

10. A machine for shredding or nodulating matted fibrous material comprising a shredding or nodulating device for progressively breaking up the material, including rotatable picker fingers, a plurality of rows of shear bars radially spaced apart within the radius of the fingers, the bars of the row farthest removed from the axis of the fingers being more widely spaced axially than the bars in the other rows, a roughened means on the shear bar, a discharge hose, a series of feeding compartments of a cross-sectional area substantially equal to that of the hose for discharging the shredded material from the feeding device in a substantially uniformly continuous stream, and a hopper having an opening disposed between the picker fingers and the feeding compartments having walls substantially coinciding with walls of the feeding compartments.

11. A machine for shredding or nodulating loosely matted fibrous material and installing the shredded or nodulated material comprising a shredding or nodulating device for progressively breaking up the material from larger to smaller shreds, rotatable picker fingers, a plurality of rows of shear bars radially spaced apart within the radius of the picker fingers, the bars in the row farthest from the axis of the fingers being more widely spaced axially than those bars in the row nearest the axis of the picker fingers, a discharge conduit, and a device between the discharge conduit and shredding device having a plurality of feeding compartments, each of which is a cross-sectional area substantially equal to that of the discharge conduit.

12. A machine for shredding or nodulating matted fibrous material and pneumatically conveying same for installation comprising a shredding or nodulating device for progressively breaking up the material, including rotatable fingers, a plurality of rows of shear bars radially spaced apart within the radius of the fingers, the bars of the row farthest removed from the axis of the fingers being more widely spaced apart than the bars in the other row, a device having a plurality of compartments for feeding the shredded or nodulated material, an opening between the fingers and the feeding device having walls substantially coinciding with the walls of the feeding compartments, a discharge conduit associated with the feeder device, the cross-sectional area of the discharge conduit being substantially equal to each of the feeder compartments, and a blower connected to the discharge conduit and feeder.

FRANK W. ANDERSON.